United States Patent
Burckart et al.

(10) Patent No.: US 8,451,721 B2
(45) Date of Patent: *May 28, 2013

(54) PATH-BASED ADAPTIVE PRIORITIZATION AND LATENCY MANAGEMENT

(75) Inventors: Erik J. Burckart, Raleigh, NC (US); John P. Cammarata, Wake Forest, NC (US); Curtis E. Hrischuk, Holly Springs, NC (US); Michael J. Spreitzer, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,457

(22) Filed: Feb. 20, 2012

(65) Prior Publication Data

US 2012/0147779 A1 Jun. 14, 2012

Related U.S. Application Data

(63) Continuation of application No. 11/693,901, filed on Mar. 30, 2007, now Pat. No. 8,199,640.

(51) Int. Cl.
*H04L 12/26* (2006.01)
*H04L 12/56* (2006.01)
*G06F 15/16* (2006.01)

(52) U.S. Cl.
USPC ............. 370/229; 370/395.42; 709/232

(58) Field of Classification Search
None
See application file for complete search history.

(56) References Cited

U.S. PATENT DOCUMENTS

| | | | |
|---|---|---|---|
| 7,460,526 B1 * | 12/2008 | Hoffman et al. | 370/357 |
| 7,616,572 B2 * | 11/2009 | Elmasry et al. | 370/235 |
| 8,199,640 B2 * | 6/2012 | Burckart et al. | 370/229 |
| 2004/0022188 A1 * | 2/2004 | Abel et al. | 370/229 |
| 2004/0257995 A1 * | 12/2004 | Sandy et al. | 370/235 |
| 2005/0063392 A1 * | 3/2005 | Ofuji et al. | 370/395.42 |
| 2007/0002740 A1 * | 1/2007 | Evans et al. | 370/230.1 |
| 2008/0155087 A1 * | 6/2008 | Blouin et al. | 709/223 |
| 2009/0086800 A1 * | 4/2009 | Cioffi | 375/222 |

OTHER PUBLICATIONS

United States Patent and Trademark Office, Office Action for U.S. Appl. No. 11/693,901, Jun. 17, 2009, pp. 1-7, Alexandria, VA, USA.
United States Patent and Trademark Office, Office Action for U.S. Appl. No. 11/693,901, Nov. 24, 2009, pp. 1-9, Alexandria, VA, USA.
United States Patent and Trademark Office, Office Action for U.S. Appl. No. 11/693,901, Sep. 16, 2011, pp. 1-5, Alexandria, VA, USA.
United States Patent and Trademark Office, Notice of Allowance for U.S. Appl. No. 11/693,901, Dec. 28, 2011, pp. 1-7, Alexandria, VA, USA.

* cited by examiner

*Primary Examiner* — Clemence Han
(74) *Attorney, Agent, or Firm* — Lee Law, PLLC; Christopher B. Lee

(57) ABSTRACT

An improved solution for managing messages through a request response protocol network utilizing a path-based adaptive prioritization and latency management is provided. A weight for a message is determined at a message management computing device based upon a number of hops and a latency of networks passed through by the message. A hop latency target for a current hop segment is evaluated relative to an overall latency target and the determined weight for the message. A priority of the message is adjusted in response to determining that the overall latency target, relative to the weight for the message and the hop latency target for the current hop segment, exceeds a configured allowable hop latency deviation for the current hop segment.

21 Claims, 3 Drawing Sheets

PATH-BASED ADAPTIVE PRIORITIZATION AND LATENCY MANAGEMENT

RELATED APPLICATIONS

This application is a continuation of and claims priority to and claims the benefit of U.S. patent application Ser. No. 11/693,901 titled "PATH-BASED ADAPTIVE PRIORITIZATION AND LATENCY MANAGEMENT," which was filed in the U.S. Patent and Trademark Office on Mar. 30, 2007, which has a current status of "Allowed," and which is incorporated herein by reference in its entirety.

BACKGROUND

Aspects of the invention relate generally to request response protocol communication networks, and more particularly, a solution for path-based adaptive prioritization and latency management of messages through such networks.

In complex communication systems, such as traditional telephone, voice over Internet protocol (VoIP), session initiation protocol (SIP), and/or the like, messages typically must pass through a variable number of hops, in order to reach their final destination. For example, in a SIP environment, the total time (end-to-end time) that it takes a message to be processed through the plurality of hops often determines as to whether or not the message is ultimately successful in reaching its final destination through the environment. In order to attempt to manage the volume of messages through their environment so they are successfully transmitted, communication system carriers typically allocate a fixed time for each hop of the network (or, system). In this manner, the overall time for the furthest (or, maximum) path (i.e., largest quantity of hops) does not exceed the allotted time, and the overall time equals merely the quantity of hops multiplied against this "per hop" fixed allocated time. This rigid and crude management of messages through the system does not account for message-specific items and is both inefficient and inflexible. For example, there is no prioritization of messages based on any other factors beyond merely allocating the fixed per hop time.

In view of the foregoing, a need exists to overcome one or more of the deficiencies in the related art.

BRIEF SUMMARY

Aspects of the invention provide an improved solution for managing a message being conveyed through a request response protocol network, which employs path-based adaptive prioritization and latency management. In an embodiment of the invention, a method of managing a message being conveyed through a request response protocol network via a path includes: receiving the message; determining for the message at least one of: an incoming portion of the path or an outgoing portion of the path; and adjusting a priority of the message based on a latency target for the determined portion of the path.

A first aspect of the invention provides a method of managing a message being conveyed through a request response protocol network via a path, the method comprising: receiving the message; determining for the message at least one of: an incoming portion of the path or an outgoing portion of the path; and adjusting a priority of the message based on a latency target for the determined portion of the path.

A second aspect of the invention provides a system for managing a message being conveyed through a request response protocol network via a path, the system comprising: a system for receiving the message; a system for determining for the message at least one of: an incoming portion of the path or an outgoing portion of the path; and a system for adjusting a priority of the message based on a latency target for the determined portion of the path.

A third aspect of the invention provides a computer program comprising program code stored on a computer-readable medium, which when executed, enables a computer system to implement a method of managing a message being conveyed through a request response protocol network via a path, the method comprising: receiving the message; determining for the message at least one of: an incoming portion of the path or an outgoing portion of the path; and adjusting a priority of the message based on a latency target for the determined portion of the path.

A fourth aspect of the invention provides a method of generating a system for managing a message being conveyed through a request response protocol network via a path, the method comprising: providing a computer system operable to: receive the message; determine for the message at least one of: an incoming portion of the path or an outgoing portion of the path; and adjust a priority of the message based on a latency target for the determined portion of the path.

A fifth aspect of the invention provides a data processing system for managing a message being conveyed through a request response protocol network via a path, comprising: a processing unit; a bus coupled to the processing unit; and a memory medium coupled to the bus comprising program code, which when executed by the processing unit causes the data processing system to: receive the message; determine for the message at least one of: an incoming portion of the path or an outgoing portion of the path; and adjust a priority of the message based on a latency target for the determined portion of the path.

A sixth aspect of the invention provides computer software embodied in at least one propagated signal for managing a message being conveyed through a request response protocol network via a path, the at least one propagated signal comprising instructions for causing at least computer system to: receive the message; determine for the message at least one of: an incoming portion of the path or an outgoing portion of the path; and adjust a priority of the message based on a latency target for the determined portion of the path.

A seventh aspect of the invention provides a business method for managing a message being conveyed through a request response protocol network via a path, the business method comprising: managing a network that includes at least one computer system that performs the process described herein; and receiving payment based on the managing.

An alternative method of managing a message being conveyed through a request response protocol network includes determining, at a message management computing device, a weight for the message based upon a number of hops and a latency of networks passed through by the message; evaluating a hop latency target for a current hop segment relative to an overall latency target and the determined weight for the message; and adjusting a priority of the message in response to determining that the overall latency target, relative to the weight for the message and the hop latency target for the current hop segment, exceeds a configured allowable hop latency deviation for the current hop segment.

An alternative system for managing a message being conveyed through a request response protocol network includes a memory and a processor programmed to determine a weight for the message based upon a number of hops and a latency of networks passed through by the message; evaluate a hop latency target for a current hop segment relative to an overall latency target and the determined weight for the message; and adjust a priority of the message in response to determining that the overall latency target, relative to the weight for the message and the hop latency target for the current hop segment, exceeds a configured allowable hop latency deviation for the current hop segment.

An alternative computer program product for managing a message being conveyed through a request response protocol network includes a computer readable storage medium including computer readable program code, where the computer readable program code when executed on a computer causes the computer to determine a weight for the message based upon a number of hops and a latency of networks passed through by the message; evaluate a hop latency target for a current hop segment relative to an overall latency target and the determined weight for the message; and adjust a priority of the message in response to determining that the overall latency target, relative to the weight for the message and the hop latency target for the current hop segment, exceeds a configured allowable hop latency deviation for the current hop segment.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention provide an improved solution for managing messages through a request response protocol network that employs a path-based adaptive prioritization and latency management. In an embodiment of the invention, a method of managing a message being conveyed through a request response protocol network via a path includes: receiving the message; determining for the message at least one of: an incoming portion of the path or an outgoing portion of the path; and adjusting a priority of the message based on a latency target for the determined portion of the path. As used herein, unless otherwise noted, the term "set" means one or more (i.e., at least one); and the phrase "any solution" means any now known or later developed solution.

Figure 1:
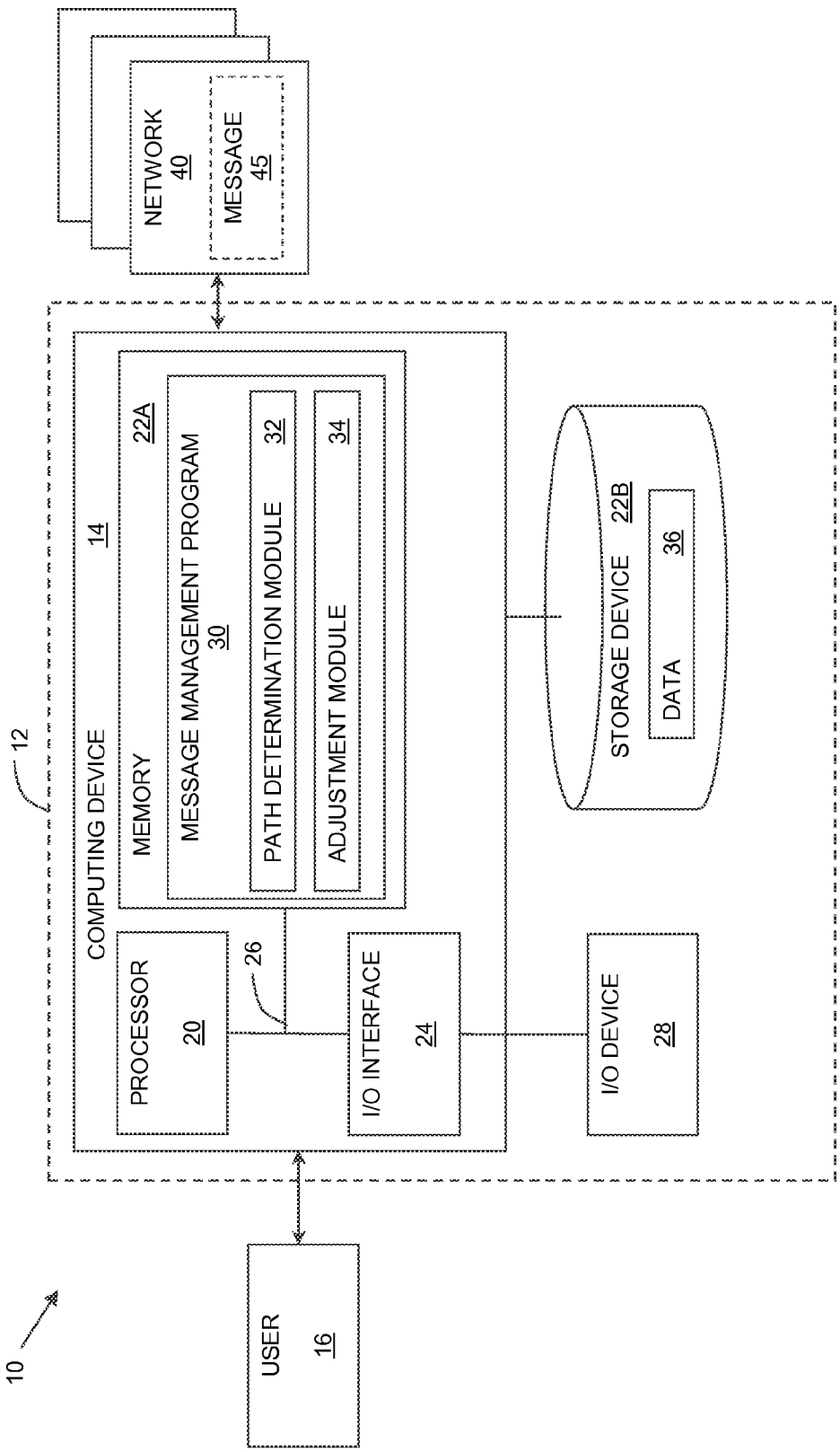
FIG. 1 shows an illustrative environment for employing a path-based adaptive prioritization and latency management according to an embodiment of the invention.

Turning to the drawings, FIG. 1 shows an illustrative environment 10 for managing a message being conveyed through a request response protocol network via a path according to an embodiment of the invention. To this extent, environment 10 includes a computer system 12 that can perform the process described herein in order to manage a message 45 being conveyed through a network 40. In particular, computer system 12 is shown including a computing device 14 that comprises a message management program 30, which makes computing device 14 operable for managing messages 45 being conveyed through a request response protocol network ("network" 40), by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as message management program 30, which is stored in a storage system, such as memory 22A and/or storage device 22B. While executing program code, processor 20 can read and/or write data, such as data 36 (e.g., path data, hop data, latency data, etc.) to/from memory 22A, storage device 22B, and/or I/O interface 24. Bus 26 provides a communications link between each of the components in computing device 14. I/O device 28 can comprise any device that transfers information between a user 16 and computing device 14 and/or other elements (e.g., message 40, network 45, etc.) and computing device 14. To this extent, I/O device 28 can comprise a user I/O device to enable an individual user 16 to interact with computing device 14 and/or a communications device to enable an element, such as a message 45 and/or network 40, to communicate with computing device 14 using any type of communications link.

In any event, computing device 14 can comprise any general purpose computing article of manufacture capable of executing program code installed thereon. However, it is understood that computing device 14 and message management program 30 are only representative of various possible equivalent computing devices that may perform the process described herein. To this extent, in other embodiments, the functionality provided by computing device 14 and message management program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, message management program 30 enables computer system 12 to manage a message 45 being conveyed through a network 40 via a path. To this extent, message management program 30 is shown including a path determination module 32, and an adjustment module 34. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Figure 2:
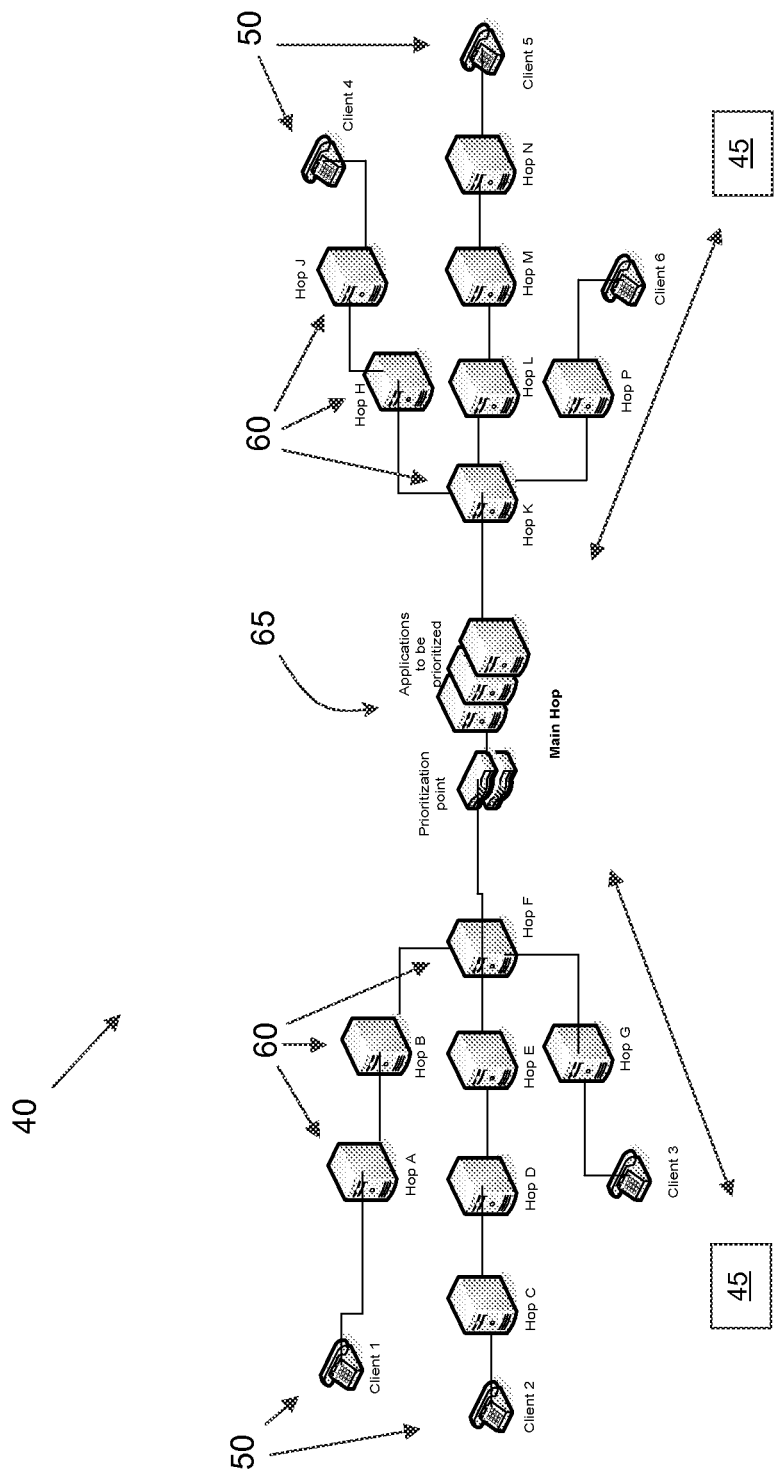
FIG. 2 shows an illustrative request response protocol network wherein the environment shown in FIG. 1 may be employed according to an embodiment of the invention.
Figure 3:
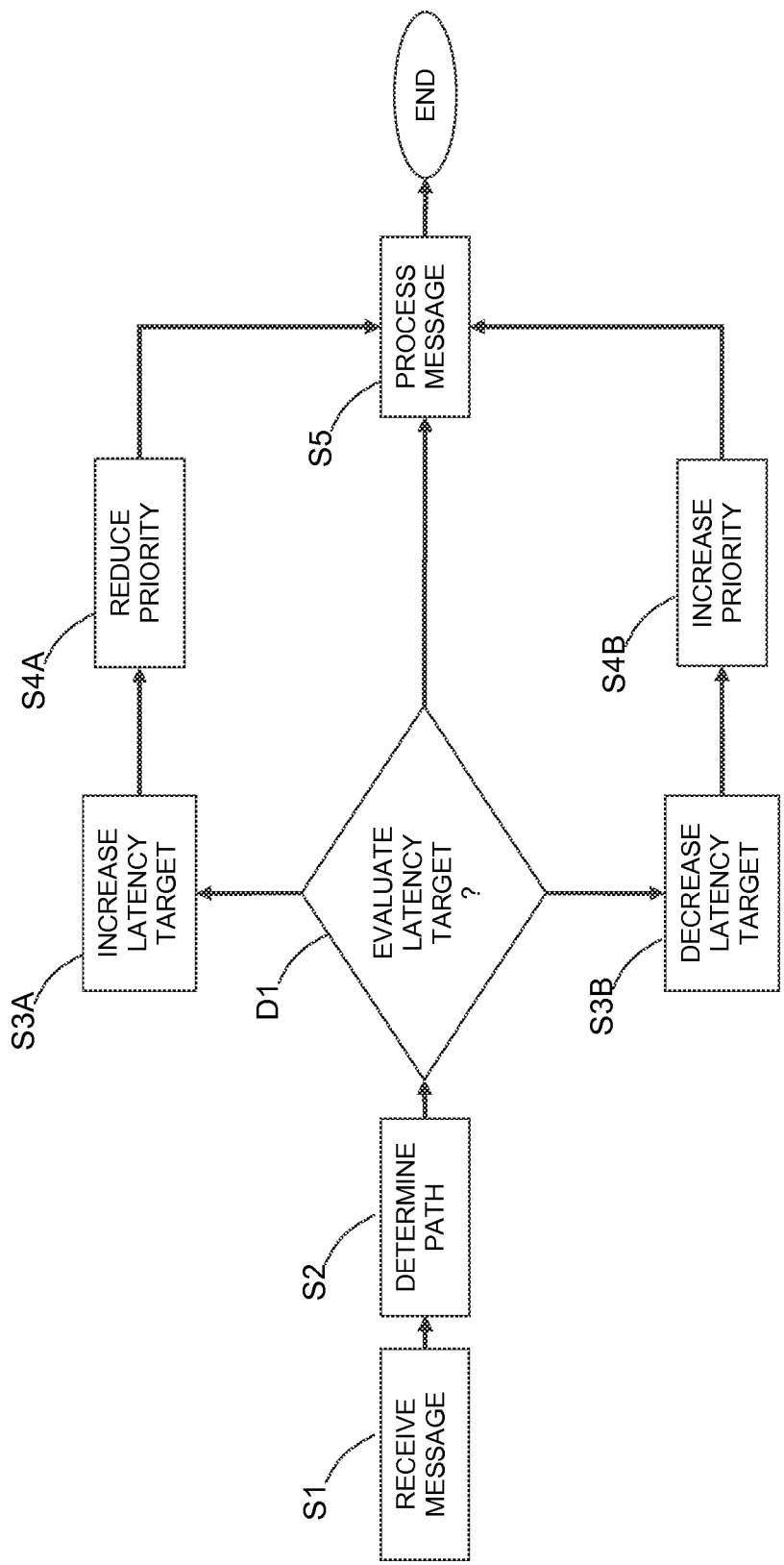
FIG. 3 shows an illustrative data flow for a path-based adaptive prioritization and latency management according to an embodiment of the invention.

Aspects of the invention provide an improved solution for managing a message 45 through a request response protocol network 40 that employs a path-based adaptive prioritization and latency management. To this extent, FIGS. 2 and 3 show an illustrative request response protocol network 40 ("network") for employing the method, and an illustrative data flow or method for using the modules of message management program 30 (FIG. 1), respectively, according to embodiments of the invention. For example, a user (e.g., administrator, customer, corporation, company, partnership, group, organization, family, entity, etc.) 16 may desire to improve the overall management, control, and/or monitoring of message(s) 45 being conveyed through a network 40 under its auspices. In an illustrative scenario, the network 40 may be a traditional telephony network (e.g., a public switch telephone network (PSTN)), a Voice over Internet Protocol (VoIP) network, a session initiation protocol (SIP) network, a photonic based system, and/or the like. The user 16 may, for example, be a telephone system and/or network provider company. In any event, the network 40 includes a plurality of clients 50 connected via a plurality of hops 60, 65. Messages 45 are conveyed via various paths from and between various clients 50.

Amongst and part of the hops 60 may be a main hop 65 which acts as a prioritization point wherein embodiments of the method may be employed. Also residing at the main hop 65 may be various applications that are attempting to be accessed by a client 50, and accordingly the access thereto is prioritized under aspects of the present invention. Alternative embodiments of the method may be employed at any one of the other hops 60.

In any event, as illustrated in FIG. 2 clients 50 (e.g., Client 1, Client 2, Client 3, Client 4, Client 5, Client 6) are connected in network 40 via various paths and hops 60 65 (e.g., Hop A-Hop P, Main Hop). Client 50 may include a computer or other access and/or communication medium that allows a user 16 to send and/or receive a message 45 through the network 40. Hops 60 (including main hop 65) may include a router, such as a proxy router.

As such, under an embodiment of the invention, the method may be employed wherein Si includes receiving a message 45. The message 45, while typically received at the main hop 65, may be received at any hop 60.

Once the message 45 is received (S1), then at S2 the path determination module 32 of system 10 (FIG. 1) determines a path of the message 45. The system 10, in determining, can recognize a set of paths and/or path lengths based on how the message 45 was received at the hop 60, 65. The system 10 determines at least one of an incoming portion of the path taken by the message 45 or an outgoing portion of the path to be taken by the message 45. The system 10 may employ one or more of the following aspects to handle the path recognition of the message 45. The aspects include, for example, route header(s) on the message 45; IP address(es) of where the message 45 came from (e.g., declaring the message 45 came from a specific portion of the network 40); and/or ID of the user/device gathered. In an embodiment, the ID may include the user/device at a specific geographic location or network 40 location. In any event, based on the recognition and determination of how the message 45 arrived at main hop 65 (e.g., received), or hop 60, the path determination module 32 (FIG. 1) calculates an approximate number of hops and a latency of networks(s) 40 passed through so as to determine a "weight" for the message 45 conveyance (e.g., transmitting) until the message 45 has been received.

S2 may include in lieu of, or in addition to, the aforementioned (e.g., determining the incoming portion of the path the message 45), the path determination module 32 (FIG. 1) determines the outgoing portion of the path the message 45 will take to complete the path through the network 40 to the other client 50. The path determination module 32 may use an ID (e.g., IP address, etc.) of the client 50 user/device that the message 45 is being sent to. The path determination module 32 determines a "weight" that the message 45 must have in order to complete a conveyance on the path through the network 40. Thus, S2 may include the path determination module 32 also obtaining a length of the entire path and/or an entire travel path for the message 45. Any information obtained by path determination module 32 may optionally be stored in data 36 (FIG. 1).

In a remaining portion of the method (e.g., D1, S3A, S4A, S3B, S4B) an adjustment module 34 (FIG. 1) then adjusts a priority of the message 45 based on a latency target for the path and/or portion of the path of the message 45. For example, the system may adjust the priority of the message 45 for a particular hop (e.g., the instant hop 60, main hop 65) based on the weight(s), thereby adjusting a latency target for the particular hop 60, 65. In this manner, the system 10 predicts whether or not there is available time (e.g., at the instant hop 65, 60) for use in adjusting while still meeting the overall, end-to-end latency goal of the system 40.

Specifically, at D1, the method includes evaluating a latency target. The network 40 includes on overall latency target, or goal, for all messages conveyed through the network 40. The overall latency target may be imposed by statute, by regulation, by technology, by dictate, by company policy, and/or the like. The overall latency target may be fixed or variable over time. For example, the overall latency target, or end-to-end time, acts as a time "ceiling" for any message 45 to pass from one client 50 to another client 50 via any path through the network 40. For example, the overall latency target of a network 40 may be 1500 milliseconds (ms). Thus, for a message 45 to be successfully conveyed between clients 50 through the network 40 and any respective hops 60, 65 along its path can take no longer than 1500 ms to do so. Besides having an overall latency target for the network 40, each hop 60, 65 may have a latency target. As with the overall network 40 latency target, various factors may also dictate the per hop 60, 65 latency target. For example, a network 40 may have a latency target for each hop 60, 65 of 100 ms. Latency target can be based on one, or more, factors including bandwidth, distance, network type, network equipment (e.g., proxies, switches, private branch exchanges (PBX'es)), and/or the like. These factors may affect the latency from the time the message 45 is sent from a client 50 until it reaches its destination at another client 50.

D1, evaluating a latency target for the instant hop (e.g., Main Hop 65), may include comparing the latency target for the instant hop 60, 65 with the overall latency target for the system 40 and/or information determined from the path (S2). For example, assume the overall latency target for the system 40 is 1500 ms; the per hop 60, 65 latency target is 100 ms; and, based on determining a portion of the path that the message 45 is taking through the network 40, the system has determined that the message 45 will pass through seven (7) other hops 60 besides the instant hop (e.g., Main Hop 65). Thus, the seven (7) other hops 60 will have a total latency of 700 ms (7*100 ms). The system then compares the available, or surplus, latency (e.g., 1500 ms-700 ms) at the instant hop (e.g., Main Hop 65) with the per hop latency target (e.g., 100 ms). As a result of this comparison the method proceeds to either S3A, S3B or S5.

If the latency target (or time available) at the instant hop (e.g., Main Hop 65) may be increased (e.g., 800 ms>100 ms), then S3A follows wherein the latency target for the instant hop (Main Hop 65) may be increased. Accordingly, S4A follows wherein the priority of the message 45 is decreased prior to processing the message 45 (S5) through the rest of the network 40 including the instant hop (e.g., Main Hop 65). Conversely, if the latency target (or time available) at the instant hop (e.g., Main Hop 65) is too close or exceeds the available latency for the instant hop (e.g., Main Hop 65), then S3B follows wherein the latency target for the instant hop (e.g., Main Hop 65) is decreased. Accordingly, S4B follows wherein the priority of the message 45 is increased prior to processing the message 45 (S5) through the rest of the network 40 including the instant hop (e.g., Main Hop 65) so that the overall latency target (e.g., 1500 ms) is still met by the message 45. Alternatively, if based on the evaluation (D1), the latency target does not require adjustment, then the message 45 is processed at S5 without any adjustment to latency and/or priority of the message 45. In this manner, the method provides for a path-based adaptive prioritization and latency management of messages 45 passing through the network 45.

Another aspect of the present invention may include the application of an algorithm so as to assist in adjusting a priority of the message. The algorithm calls for comparing the following two values: $Ph_{avail}$ and Dh*Ph, where:

$Ph_{avail}=Pe-Pi-Po-Ph$, where:

Pe=Z=overall, end-to-end path weight allowed
Pi=weight of the incoming path
Po=weight of the outgoing path
Ph=weight, or fixed weight, normally allotted to particular hop (or original latency target)

And, Dh=an allowable percentage deviation (e.g., 10%) for the particular hop 60, 65 being evaluated.

Variable, Dh, is the acceptable deviation for this particular hop 60, 65 before altering message 45 priorities. Thus, as $Ph_{avail}$ is compared to the value, Dh*Ph, when $Ph_{avail}$>Dh*Ph, then the priority of the message 45 is decreased as the system 10 can allow more time for processing of message 45 at the hop 60, 65. As a result, the latency target for this request (originally=Ph) is increased. Conversely, when $Ph_{avail}$<−1*Dh*Ph, then the priority of the message 45 is increased as the system 10 is under a time "crunch" to process this particular message 45 at the hop 60, 65. As a result, the latency target for this request (originally=Ph) is decreased. If, for example, Dh was 10%, then an acceptable deviation (i.e., not requiring adjustment of priority and/or latency target) would be in range from −10%*Ph to +10%*Ph. Thus, if Ph was, for example, 100 ms, then any deviation within 10 ms (i.e., −10 ms to +10 ms) of 100 ms is an acceptable deviation (i.e., 90 ms to 110 ms).

Another aspect of the present invention when applied to the illustrative network 40 in FIG. 2 may include having an overall (or end-to-end) path length that is Z milliseconds (ms), where, for example, Z=1500 ms. The maximum path through the network 40 is from "Client 2" 50 to "Client 5" 50. That is for a message 45 to be conveyed along the longest path in the network 40 would require the message 45 to start at "Client 2" 50 and proceed to "Hop C"; then to "Hop D"; then to "Hop E"; then to "Hop F", and on to the Main Hop 65. From the Main Hop 65 the message 45 is conveyed to "Hop K"; and then proceeds to "Hop L"; then to "Hop M"; then to "Hop N"; and finally reaches its destination at "Client 5". Conversely, the message 45 may be conveyed from Client 5 to Client 2. The minimum path through the network 40 is from "Client 3" 50 to "Client 6" 50 (or from Client 6 to Client 3). For a message 45 to be conveyed along the shortest path in the network 40 would require the message 45 to start at "Client 3" 50 and proceed to "Hop G"; then to "Hop F"; and on to the Main Hop 65. From the Main Hop 65 the message 45 is conveyed to "Hop K"; then to "Hop P"; and then proceeds to its final destination at "Client 5". Thus, if the path that the message 45 is taking through the network 40 is at, or approaching, the minimum path, then the application(s) in the Main Hop 65 have more time to process the message 45 than if the message 45 is at, or approaching, the maximum path. Presume, in the example, that each hop 60, with the exception of the Main Hop 65, is allocated 100 ms and Z (i.e., end-to-end time) is allocated 1500 ms. Then at the maximum path (i.e., "Client 2" to "Client 5"), the Main Hop 65 would have 500 ms available to respond because of the ten (10) other hops (i.e., 10×100 ms=1,000 ms) along the path. Conversely, at the minimum path (i.e., "Client 3" to "Client 6"), the Main Hop 65 would have 900 ms available to respond because of the six (6) other hops (i.e., 6×100 ms=600 ms) along the path. As a result of the available times at the Main Hop 65 for the respective message 45 paths, the request for the message 45, via the minimum path, may be prioritized lower at the Main Hop 65 than the message 45 that is via the maximum path (i.e., 900 ms available vs. 500 ms available) so as to ensure that the message(s) 45 in the maximum path are completed in time (i.e., at, or less than, Z).

In another embodiment, the invention provides a computer program stored on a computer-readable medium, which when executed, enables a computer system to manage a message 45 being conveyed through a request response protocol network 40. To this extent, the computer-readable medium includes program code, such as message management program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), on paper (e.g., capable of being scanned and converted to electronic data), and/or the like.

In another embodiment, the invention provides a method of generating a system for managing a message 45 being conveyed through a request response protocol network 40. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages a message 45 being conveyed through a request response protocol network 40, which enables users to perform the process described herein on a subscription, advertising, and/or fee basis. That is, a service provider could offer to manage a network and/or a computer system 12 (FIG. 1) that allows users to manage a message 45 being conveyed through a request response protocol network 40 as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a message being conveyed through a request response protocol network, the method comprising:
   determining, at a message management computing device, a weight for the message based upon a number of hops and a latency of networks passed through by the message;
   evaluating a hop latency target for a current hop segment relative to an overall latency target and the determined weight for the message; and
   adjusting a priority of the message in response to determining that the overall latency target, relative to the weight for the message and the hop latency target for the current hop segment, exceeds a configured allowable hop latency deviation for the current hop segment.

2. The method of claim 1, further comprising predicting whether there is available time for use in adjusting the priority of the message while still meeting the overall latency target.

3. The method of claim 1, where:
   evaluating the hop latency target for the current hop segment relative to the overall latency target and the determined weight for the message comprises:
      determining whether the hop latency target for the current hop segment may be increased while still meeting the overall latency target; and
   adjusting the priority of the message in response to determining that the overall latency target, relative to the weight for the message and the hop latency target for the current hop segment, exceeds the configured allowable hop latency deviation for the current hop segment comprises, in response to determining that the hop latency target for the current hop segment may be increased while still meeting the overall latency target:
      increasing the hop latency target for the current hop segment; and
      reducing the priority of the message.

4. The method of claim 1, where:
   evaluating the hop latency target for the current hop segment relative to the overall latency target and the determined weight for the message comprises:
      determining whether the hop latency target for the current hop segment may be decreased while still meeting the overall latency target; and
   adjusting the priority of the message in response to determining that the overall latency target, relative to the weight for the message and the hop latency target for the current hop segment, exceeds the configured allowable hop latency deviation for the current hop segment comprises, in response to determining that the hop latency target for the current hop segment may be decreased while still meeting the overall latency target:
      decreasing the hop latency target for the current hop segment; and
      increasing the priority of the message.

5. The method of claim 1, where evaluating the hop latency target for the current hop segment relative to the overall latency target and the determined weight for the message comprises determining whether an available processing time for the message at the current hop segment indicates that a path of the message through the networks is approaching a maximum path through the networks.

6. The method of claim 1, where evaluating the hop latency target for the current hop segment relative to the overall latency target and the determined weight of the message comprises determining whether an available processing time for the message at the current hop segment indicates that a path of the message through the networks is approaching a minimum path through the networks.

7. The method of claim 1, where determining, at the message management computing device, the weight for the message based upon the number of hops and the latency of the networks passed through by the message comprises:
   determining a length of an entire travel path of the message through the networks; and
   determining the weight for the message based upon the number of hops and the latency of the networks passed through by the message relative to the determined length of the entire travel path of the message through the networks.

8. A system for managing a message being conveyed through a request response protocol network, the system comprising:
   a memory; and
   a processor programmed to:
      determine a weight for the message based upon a number of hops and a latency of networks passed through by the message;
      evaluate a hop latency target for a current hop segment relative to an overall latency target and the determined weight for the message; and
      adjust a priority of the message in response to determining that the overall latency target, relative to the weight for the message and the hop latency target for the current hop segment, exceeds a configured allowable hop latency deviation for the current hop segment.

9. The system of claim 8, where the processor is further programmed to predict whether there is available time for use in adjusting the priority of the message while still meeting the overall latency target.

10. The system of claim 8, where:
in being programmed to evaluate the hop latency target for the current hop segment relative to the overall latency target and the determined weight for the message, the processor is programmed to:
   determine whether the hop latency target for the current hop segment may be increased while still meeting the overall latency target; and
in being programmed to adjust the priority of the message in response to determining that the overall latency target, relative to the weight for the message and the hop latency target for the current hop segment, exceeds the configured allowable hop latency deviation for the current hop segment, the processor is programmed to, in response to determining that the hop latency target for the current hop segment may be increased while still meeting the overall latency target:
   increase the hop latency target for the current hop segment; and
   reduce the priority of the message.

11. The system of claim 8, where:
in being programmed to evaluate the hop latency target for the current hop segment relative to the overall latency target and the determined weight for the message, the processor is programmed to:
   determine whether the hop latency target for the current hop segment may be decreased while still meeting the overall latency target; and
in being programmed to adjust the priority of the message in response to determining that the overall latency target, relative to the weight for the message and the hop latency target for the current hop segment, exceeds the configured allowable hop latency deviation for the current hop segment, the processor is programmed to, in response to determining that the hop latency target for the current hop segment may be decreased while still meeting the overall latency target:
   decrease the hop latency target for the current hop segment; and
   increase the priority of the message.

12. The system of claim 8, where, in being programmed to evaluate the hop latency target for the current hop segment relative to the overall latency target and the determined weight for the message, the processor is programmed to determine whether an available processing time for the message at the current hop segment indicates that a path of the message through the networks is approaching a maximum path through the networks.

13. The system of claim 8, where, in being programmed to evaluate the hop latency target for the current hop segment relative to the overall latency target and the determined weight of the message, the processor is programmed to determine whether an available processing time for the message at the current hop segment indicates that a path of the message through the networks is approaching a minimum path through the networks.

14. The system of claim 8, where, in being programmed to determine the weight for the message based upon the number of hops and the latency of the networks passed through by the message, the processor is programmed to:
   determine a length of an entire travel path of the message through the networks; and
   determine the weight for the message based upon the number of hops and the latency of the networks passed through by the message relative to the determined length of the entire travel path of the message through the networks.

15. A computer program product for managing a message being conveyed through a request response protocol network, the computer program product comprising computer readable program code embodied on a computer readable storage article of manufacture, where the computer readable program code when executed on a computer causes the computer to:
   determine a weight for the message based upon a number of hops and a latency of networks passed through by the message;
   evaluate a hop latency target for a current hop segment relative to an overall latency target and the determined weight for the message; and
   adjust a priority of the message in response to determining that the overall latency target, relative to the weight for the message and the hop latency target for the current hop segment, exceeds a configured allowable hop latency deviation for the current hop segment.

16. The computer program product of claim 15, where the computer readable program code when executed on the computer further causes the computer to predict whether there is available time for use in adjusting the priority of the message while still meeting the overall latency target.

17. The computer program product of claim 15, where:
in causing the computer to evaluate the hop latency target for the current hop segment relative to the overall latency target and the determined weight for the message, the computer readable program code when executed on the computer causes the computer to:
   determine whether the hop latency target for the current hop segment may be increased while still meeting the overall latency target; and
in causing the computer to adjust the priority of the message in response to determining that the overall latency target, relative to the weight for the message and the hop latency target for the current hop segment, exceeds the configured allowable hop latency deviation for the current hop segment, the computer readable program code when executed on the computer causes the computer to, in response to determining that the hop latency target for the current hop segment may be increased while still meeting the overall latency target:
   increase the hop latency target for the current hop segment; and
   reduce the priority of the message.

18. The computer program product of claim 15, where:
in causing the computer to evaluate the hop latency target for the current hop segment relative to the overall latency target and the determined weight for the message, the computer readable program code when executed on the computer causes the computer to:
   determine whether the hop latency target for the current hop segment may be decreased while still meeting the overall latency target; and
in causing the computer to adjust the priority of the message in response to determining that the overall latency target, relative to the weight for the message and the hop latency target for the current hop segment, exceeds the configured allowable hop latency deviation for the current hop segment, the computer readable program code when executed on the computer causes the computer to, in response to determining that the hop latency target for the current hop segment may be decreased while still meeting the overall latency target:
   decrease the hop latency target for the current hop segment; and
   increase the priority of the message.

19. The computer program product of claim 15, where, in causing the computer to evaluate the hop latency target for the current hop segment relative to the overall latency target and the determined weight for the message, the computer readable program code when executed on the computer causes the computer to determine whether an available processing time for the message at the current hop segment indicates that a path of the message through the networks is approaching a maximum path through the networks.

20. The computer program product of claim 15, where, in causing the computer to evaluate the hop latency target for the current hop segment relative to the overall latency target and the determined weight of the message, the computer readable program code when executed on the computer causes the computer to determine whether an available processing time for the message at the current hop segment indicates that a path of the message through the networks is approaching a minimum path through the networks.

21. The computer program product of claim 15, where, in causing the computer to determine the weight for the message based upon the number of hops and the latency of the networks passed through by the message, the computer readable program code when executed on the computer causes the computer to:
   determine a length of an entire travel path of the message through the networks; and
   determine the weight for the message based upon the number of hops and the latency of the networks passed through by the message relative to the determined length of the entire travel path of the message through the networks.

* * * * *